United States Patent [19]

Kang

[11] Patent Number: 5,675,692

[45] Date of Patent: Oct. 7, 1997

[54] DOUBLE PICTURE GENERATION APPARATUS FOR VIDEO CASSETTE TAPE RECORDER

[75] Inventor: Kyung Jin Kang, Seoul, Rep. of Korea

[73] Assignee: LG Electronics Inc., Seoul, Rep. of Korea

[21] Appl. No.: 621,160

[22] Filed: Mar. 22, 1996

[30] Foreign Application Priority Data

Mar. 23, 1995 [KR] Rep. of Korea .................... 6201/1995

[51] Int. Cl.⁶ .................................................. H04N 9/79
[52] U.S. Cl. ............................................ 386/1; 386/131
[58] Field of Search ............................... 358/335, 310; 360/33.1; 348/556, 557, 564, 565, 566, 567, 568, 584, 588, 44, 42, 43; 386/1, 46, 131, 909, 906.1

[56] References Cited

U.S. PATENT DOCUMENTS

| | | | |
|---|---|---|---|
| 4,897,722 | 1/1990 | Flory . | |
| 4,982,288 | 1/1991 | Isobe et al. . | |
| 5,159,438 | 10/1992 | Rabii . | |
| 5,313,303 | 5/1994 | Ersoz et al. | 348/439 |
| 5,353,065 | 10/1994 | Katsumata et al. | 348/556 |
| 5,420,641 | 5/1995 | Tsuchida | 348/556 |
| 5,426,534 | 6/1995 | Nakata et al. | 360/15 |
| 5,438,372 | 8/1995 | Tsumori et al. | 348/365 |
| 5,442,406 | 8/1995 | Altmanshofer et al. | 348/588 |
| 5,515,173 | 5/1996 | Mankovitz et al. . | |
| 5,534,934 | 7/1996 | Katsumata et al. | 348/445 |

Primary Examiner—Andrew Faile
Assistant Examiner—Aung S. Moe

[57] ABSTRACT

An improved double picture generation apparatus for a VCR by which it is possible to concurrently watch two pictures on one screen of a television set, which includes a selection unit for receiving a video signal and an audio signal separated by a tuner/intermediate frequency processing unit, a video signal and an audio signal reproduced by a recording/reproducing unit, a video signal and an audio signal inputted thereto through an audio/video input terminal and for outputting at least two video signal and audio signals in accordance with a selection signal; an ARC/DW module for receiving two video signals outputted from the selection unit and generating a video signal of two pictures; an NTSC encoder for encoding a video signal of two pictures outputted from the ARC/DW module in accordance with an NTSC broadcast method and for outputting to an audio/video output terminal; and an output unit for modulating a video signal of two pictures encoded by the NTSC encoder and an audio signal outputted from the output unit and for outputting the signals to a television set.

14 Claims, 5 Drawing Sheets

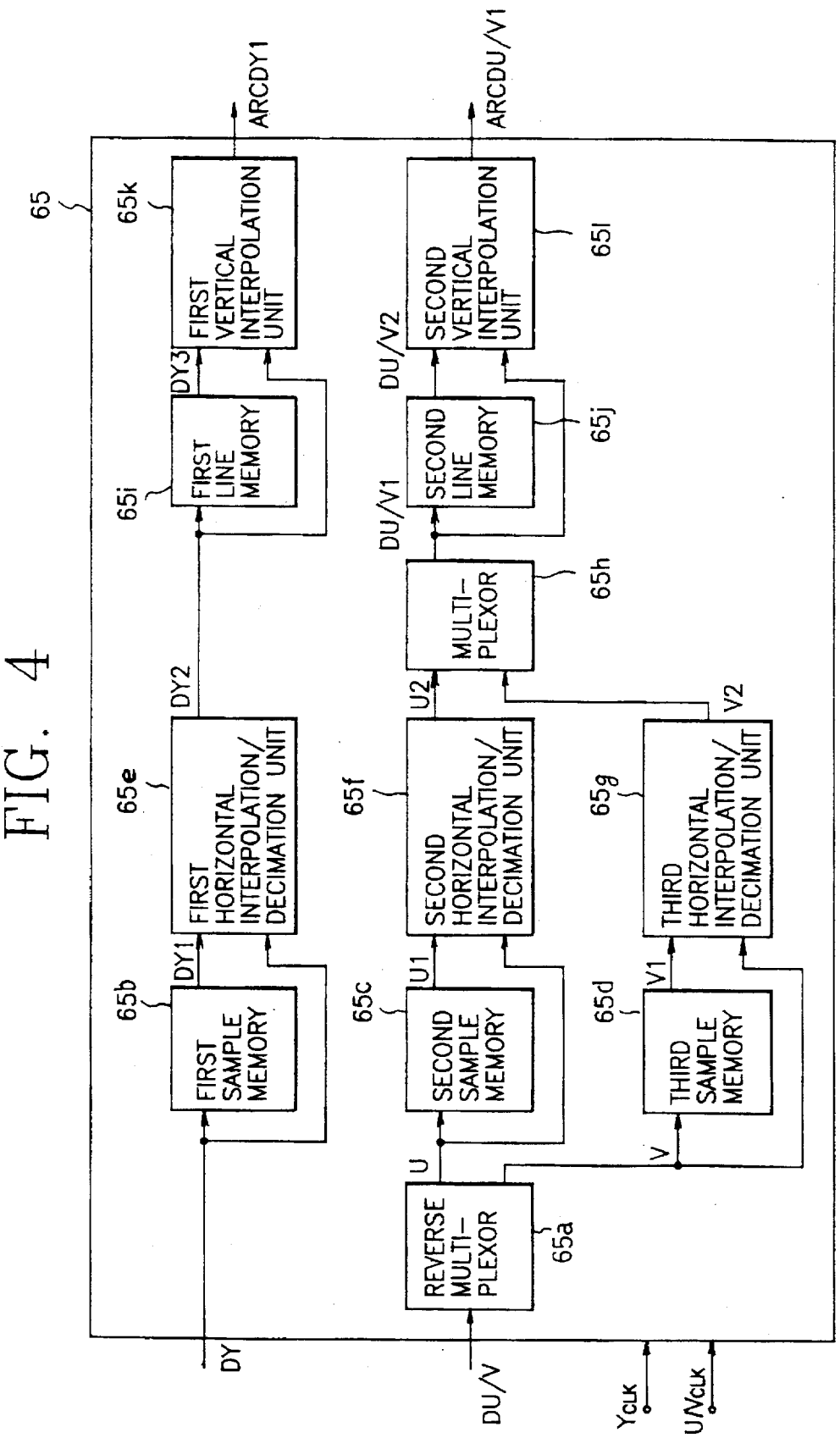

DOUBLE PICTURE GENERATION APPARATUS FOR VIDEO CASSETTE TAPE RECORDER

BACKGROUND OF THE INVENTION

1. Field of the Invention

The present invention relates to a double picture generation apparatus for a video cassette tape recorder (VCR), and particularly to an improved double picture generation apparatus for a VCR by which it is possible to concurrently watch a horizontal double picture and a vertical double picture with one television set by selecting two kinds of video signals from a plurality of video signals inputted thereto and by adjusting an aspect ratio of a picture using an aspect ratio converter/double window (ARC/DW) module.

2. Description of the Conventional Art

As well known to those skilled in the art, the conventional picture processing apparatus for a VCR, as shown in FIG. 1, includes an antenna distribution unit 1 for distributing a high frequency signal RF inputted from an antenna, a tuner 2 for converting the distributed high frequency signal into an intermediate frequency signal IF in accordance with a frequency of a corresponding broadcast channel, an intermediate frequency processing unit 3 for amplifying an intermediate frequency signal outputted from the tuner 2 and for separating the signal into a video signal and an audio signal, an audio/video selection unit 4 for selectively outputting an audio signal and a video signal inputted thereto through the intermediate frequency processing unit 3 or inputted thereto from an externally connected audio/video input terminal 108 in accordance with a switching control signal, a recording/reproducing unit 5 for recording/reproducing a video signal and an audio signal outputted from the audio/video selection unit 4, a high frequency modulation unit 6 for modulating a high frequency signal by corresponding the video signal and the audio signal reproduced by the recording/reproducing unit 5 to a certain channel selected by a user, and an automatic antenna switching unit 7 for outputting a high frequency signal outputted from the antenna distribution unit 1 to the television set in the recording mode and for automatically outputting a high frequency signal outputted from the high frequency modulation unit 6 to the television set in the reproducing mode.

The operation of the conventional picture processing apparatus for a VCR will now be explained with reference to the accompanying drawing.

To begin with, the high frequency signal of a VHF/UHF inputted to the system through the antenna ANT is distributed into two outputs by the antenna distribution unit 1, and the distributed signals are outputted to the automatic antenna switching unit 7 and the tuner 2.

Among the signals, a high frequency signal inputted to the automatic antenna switching unit 7 is outputted to the television set (not shown) through a high frequency signal output terminal 110, and a high frequency signal inputted to the tuner 2 is converted into an intermediate frequency signal in accordance with a frequency of a corresponding broadcast channel, and the intermediate frequency signal is amplified by the intermediate frequency processing unit 3, separated into a video signal and an audio signal, and is outputted to the audio/video selection unit 4.

Thereafter, first and second switches 4a and 4b of the audio/video selection unit 4 receive two pairs of video/audio signals from the intermediate frequency processing unit 3 and an externally connected audio/video input terminal 108, select a pair of video signal/audio signals in accordance with a switching control signal, and output to the recording/reproducing unit 5.

At this time, when the user selects the recording mode, the video/audio signals of a band-pass intermediate frequency outputted from the audio/video selection unit 4 are recorded on a video tape of the recording/reproducing unit 5.

That is, when the VCR is in the recording mode, the high frequency signal of the broadcast station applied thereto through the antenna ANT is directly transmitted to the television set (not shown) side through the antenna distribution unit 1 and the automatic antenna switching unit 7.

Thereafter, when the user selects the reproducing mode, the recording/reproducing unit 5 reproduces the video signal and the audio signal of a band-pass intermediate frequency recorded on the video tape and outputs to the audio/video output terminal 109 and the high frequency modulation unit 6.

At this time, when the user selects either a channel 3 or a channel 4 using a channel selection switch "a", the high frequency modulation unit 6 corresponds the video signal and the audio signal of a band-pass intermediate frequency reproduced by the recording/reproducing unit 5 to a selected channel and outputs to the automatic antenna switching unit 7 after modulating it to the high frequency.

Therefore, the automatic antenna switching unit 7 directly transmits a high frequency signal inputted thereto through the antenna ANT to the television set in the recording mode, and is automatically switched to the output side of the high frequency modulation unit 6 in the reproducing mode, and transmits the high frequency signal outputted from the high frequency modulation unit 6 to the television set through the high frequency signal output terminal 110. That is, since it is difficult to mix the channel with a high frequency signal, a certain high frequency signal is selected and outputted from the automatic antenna switching unit 7.

However, since the conventional picture processing apparatus for a VCR is directed to selecting only one signal among a ½ VHS tape signal, an 8 mm tape signal, a tuner input signal (when two tuners are provided, it is referred to two channel signals), and an external audio/video input signal and outputting to the audio/video output terminal or the high frequency output terminal 110, it is impossible to concurrently watch two different pictures at one television set.

SUMMARY OF THE INVENTION

Accordingly, it is an object of the present invention to provide a double picture generation apparatus for a VCR, which overcomes the problems encountered in a conventional picture processing apparatus for a VCR.

It is another object of the present invention to provide an improved double picture generation apparatus for a VCR by which it is possible to concurrently watch double pictures on one screen of a television set by selecting two signals among a plurality of video signals, processing the signals to a horizontal double picture and a vertical double picture by using an aspect ratio control/double window (ARC/DW) of a picture.

It is another object of the present invention to provide an improved double picture generation apparatus for a VCR by which it is possible to generate a double picture of two broadcasts concurrently using a television channel and a VCR channel when adapting the embodiment of the present invention to a TVCR (referred to a television internally provided with a video cassette tape recorder) and it is possible to easily select between a single picture function and a double picture function in accordance with a user's desire.

To achieve the above objects, in accordance with one embodiment of the present invention, there is provided a double picture generation apparatus for a VCR, which includes a selection unit for receiving a video signal and an audio signal separated by a tuner/intermediate frequency processing unit, a video signal and an audio signal reproduced by a recording/reproducing unit, a video signal and an audio signal inputted thereto through an audio/video input terminal and for outputting at least two video signal and audio signals in accordance with a selection signal; an ARC/DW module for receiving two video signals outputted from the selection unit and generating a video signal of double pictures; an NTSC encoder for encoding a video signal of double pictures outputted from the ARC/DW module in accordance with an NTSC broadcast method and for outputting to an audio/video output terminal; and an output unit for modulating a video signal of double pictures encoded by the NTSC encoder and an audio signal outputted from the output unit and for outputting the signals to a television set.

To achieve the above objects, in accordance with another embodiment of the present invention, there is provided a double picture generation apparatus for a VCR, which includes a selection unit for receiving a plurality of video signals and audio signals in cooperation with a plurality of input units and for selecting two video signals and audio signals; a double picture generation unit for receiving a video signal outputted from the selection unit, adjusting a horizontal size and a vertical size, and generating a video signal of a double picture; an encoding unit for encoding a video signal of a double picture outputted from the double picture generation unit in accordance with a television broadcasting method; and an output unit for outputting a video signal of a double picture encoded by the encoding unit to a television set.

To achieve the above objects, in accordance with still another embodiment of the present invention, there is provided a double picture generation apparatus for a VCR, which includes a selection unit for receiving a plurality of video signal and audio signals in cooperation with a plurality of input units and for selecting two video signals and audio signals; a double picture generation unit for receiving a video signal outputted from the selection unit, adjusting a horizontal size and a vertical size of pictures, and generating a video signal of a double picture; and an output unit for converting a video signal of a double picture outputted from the double picture generation unit into a corresponding broadcast signal.

BRIEF DESCRIPTION OF THE DRAWINGS

FIG. 4 is a detailed block diagram of a left-side picture processing unit and a right-side picture processing unit of FIG. 3 according to the present invention.

DETAILED DESCRIPTION OF THE INVENTION

Figure 1:
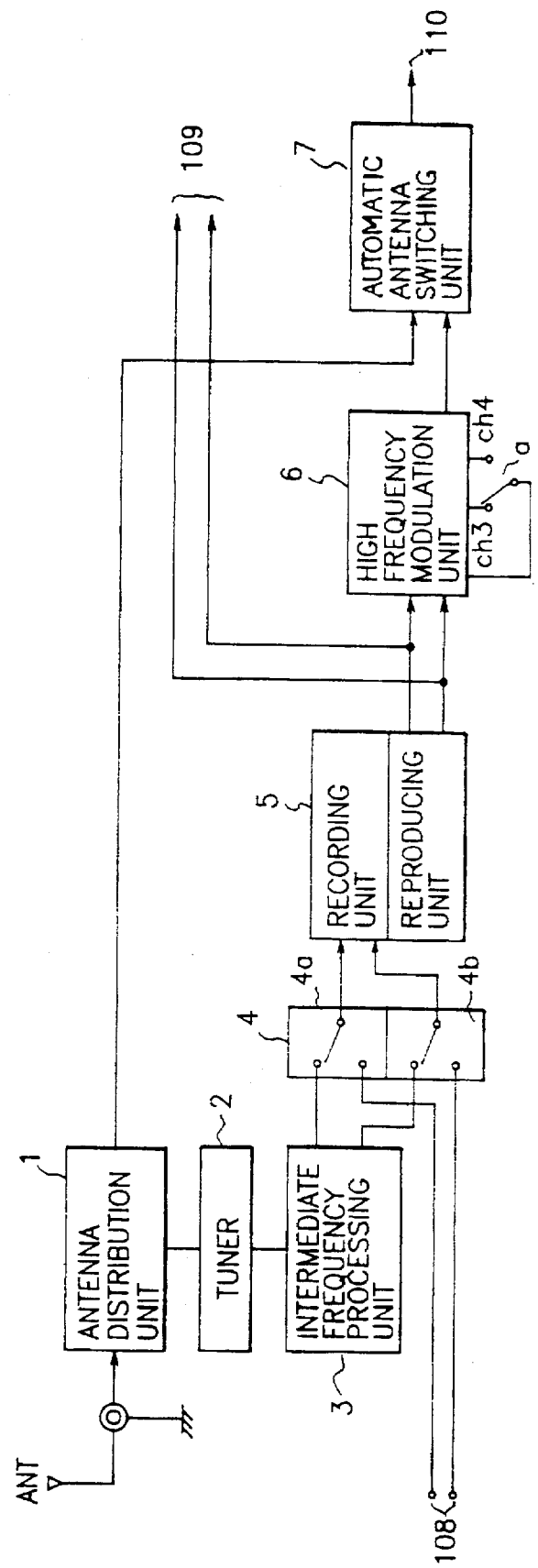
FIG. 1 is a block diagram of a conventional picture processing apparatus for a VCR.
Figure 2:
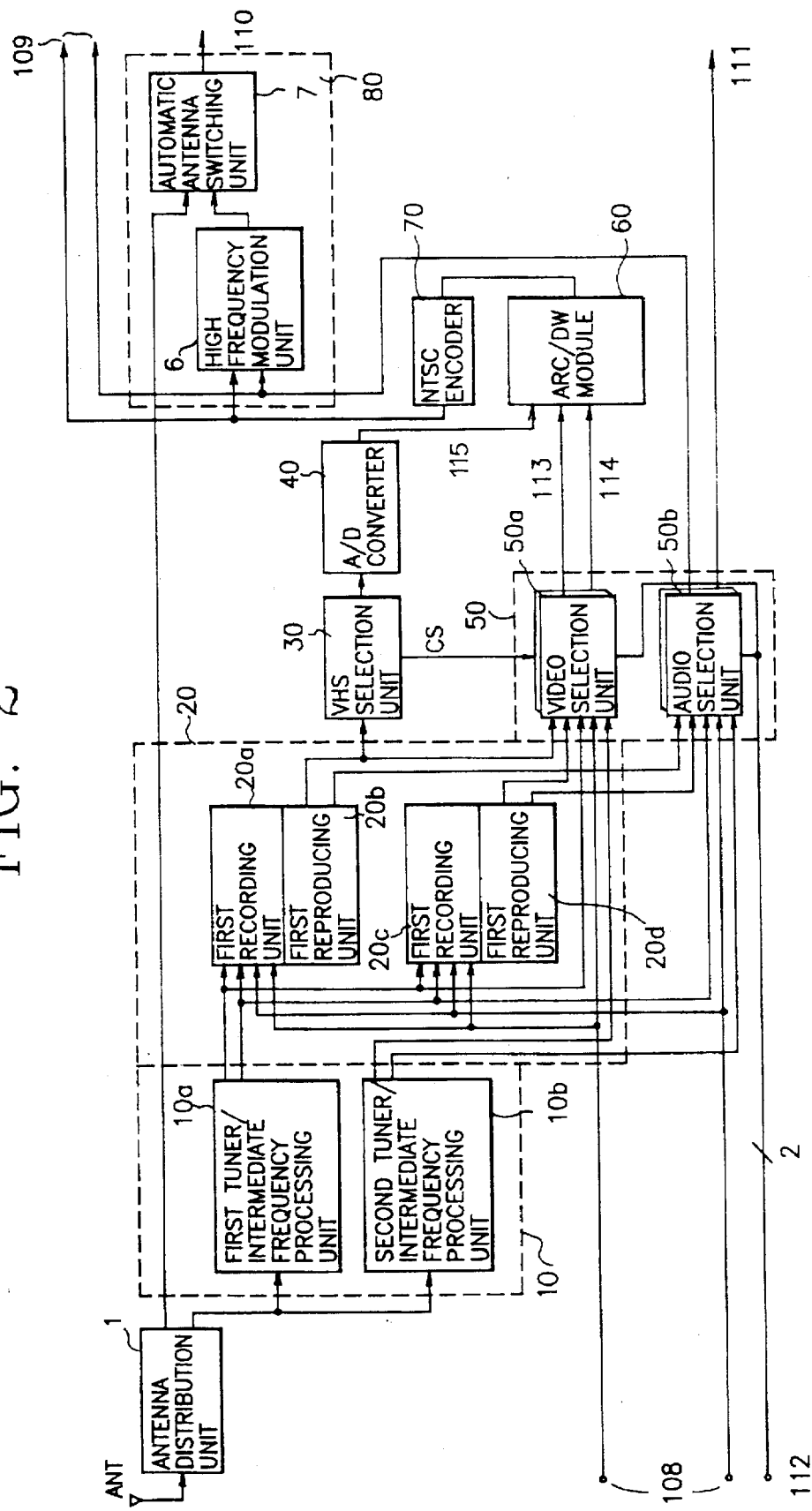
FIG. 2 is a block diagram of a double picture generation apparatus for a VCR according to the present invention.

FIG. 2 shows a double picture generation apparatus for a VCR according to the present invention, which includes an antenna distribution unit 1 for distributing a high frequency signal inputted to the system through an antenna, a broadcast signal receiving processing unit 10 internally including first and second tuner/intermediate frequency processing units 10a and 10b for converting the high frequency signal distributed by the antenna distribution unit 1 into an intermediate frequency signal in accordance with a frequency of a corresponding broadcast channel and for separating the signal into a video signal and an audio signal, a recording/reproducing unit 20 for recording/reproducing a video signal and an audio signal outputted from the broadcast signal receiving processing unit 10 and an externally connected audio/video input terminal 108, an S-VHS selection unit 30 for selecting an S-VHS signal from the video signal reproduced by the recording/reproducing unit 20, an A/D converter 40 for digitally converting the S-VHS signal selected by the S-VHS selection unit 30, a selection unit 50 for receiving a video signal and an audio signal from the broadcast signal receiving processing unit 10, the recording/reproducing unit 20, and the externally connected audio/video input terminal 108, outputting two different video/audio signals in accordance with an external selection signal, and outputting one video signal and two audio signals in accordance with a control signal of the S-VHS selection unit 30, an aspect ratio converter/double window module (ARC/DW) 60 for receiving two video signal from the selection unit 50, or one video signal from the selection unit 50, and an S-VHS signal outputted from the A/D converter 40 and for generating double picture video signal by adjusting the aspect ratio thereof, an NTSC encoder 70 for encoding the double video signal outputted from the ARC/DW module 60 in accordance with an NTSC broadcast method, and an output unit 80 for receiving two picture video signal encoded by the NTSC encoder 70 and one audio signal outputted from the selection unit 50, and for modulating the signal into a high frequency signal.

The selection unit 50 includes a video selection unit 50a and an audio selection unit 50b each having two 4×1 analog multiplexors, and the recording/reproducing unit 20 includes a first recording unit 20a and a first reproducing unit 20b for recording/reproducing a VHS tape signal in accordance with the operation mode of the VCR, and a second recording unit 20c and a second reproducing unit 20d for recording/reproducing an 8 mm tape signal. That is, the above-mentioned construction is referred to a double deck construction. The same elements as the prior art are given the same reference numerals in this embodiment of the present invention.

Figure 3:
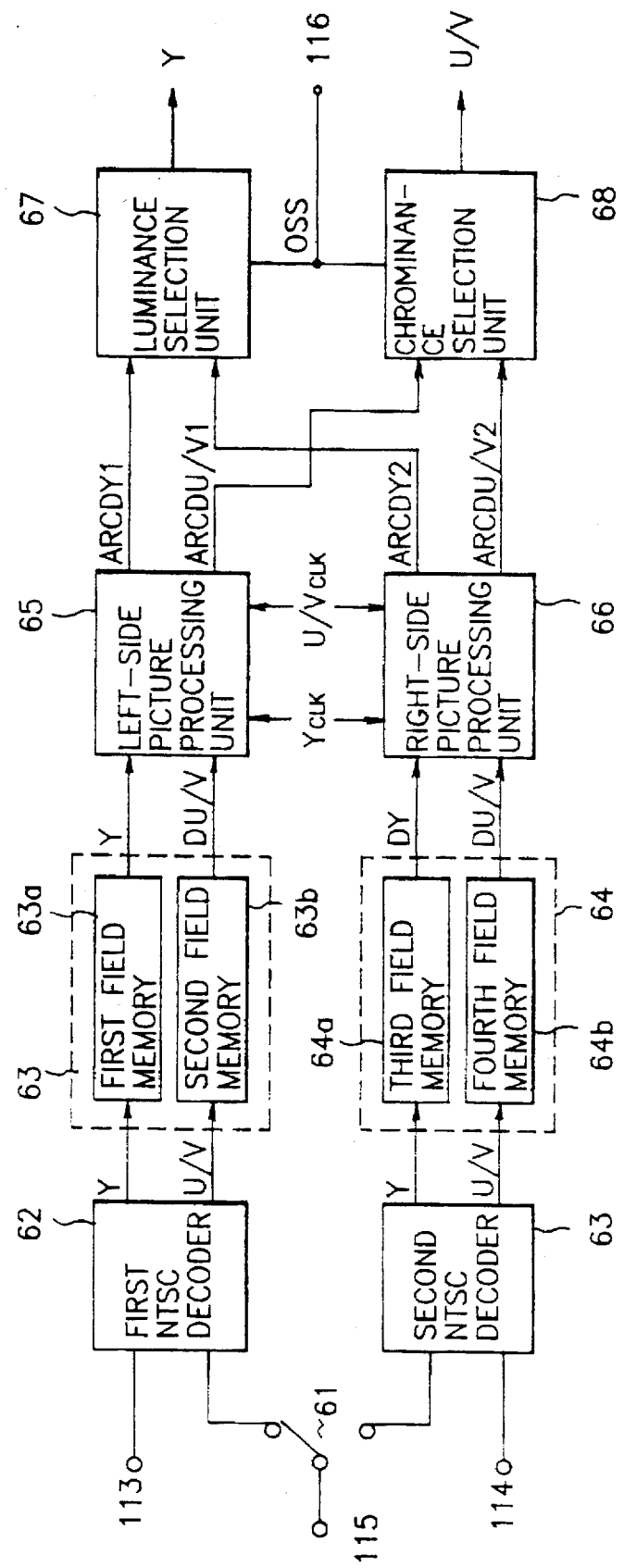
FIG. 3 is a detailed block diagram of an ARC/DW module of FIG. 2 according to the present invention.

The ARC/DW module 60, as shown in FIG. 3, includes a switch 61 for selectively outputting a video signal of an S-VHS outputted from the A/D converter 40, first and second NTSC decoders 62 and 63 for receiving two video signals from the selection unit 50, or one video signal from the selection unit 50, and a video signal of an S-VHS, for decoding the signal in accordance with an NTSC broadcast method, and for separating the signal into a luminance signal Y and a chrominance signal U/V, a first buffering unit 63 having first and second field memories 63a and 63b for adjusting a write/read speed difference between the luminance signal Y and the chromiannce signal U/V outputted from the first NTSC decoder 62, a second buffering unit 64 having third and fourth field memories 64a and 64b for adjusting a write/read speed difference between the luminance signal Y and the chrominance signal U/V outputted from the second NTSC decoder 63, a left-side picture processing unit 65 and a right-side picture processing unit 66 for receiving a digital luminance signal DY and a digital chrominance signal DU/V from the first and second buffering units 63 and 64, performing a horizontal interpolation/ decimation and vertical interpolation in accordance with externally applied luminance signal clock $Y_{CLK}$ and a chrominance signal clock U/V$_{CLK}$, and outputting a left-side picture and a right-side picture of which its aspect ratio is adjusted, a luminance selection unit 67 for receiving a digital luminance signal ARCDY of which its aspect ratio is adjusted by the left-side picture processing unit 65 and the right-side picture processing unit 66 and for outputting a double picture luminance signal Y in accordance with an output selection signal OSS, and a chrominance selection unit 68 for receiving a digital chrominance signal ARCDU/V of which its aspect ratio is adjusted by the left-side picture processing unit 65 and the right-side picture processing unit 66 and for outputting a double picture chrominance signal U/V in accordance with an output selection signal OSS.

The left-side picture processing unit 65, as shown in FIG. 4, includes a reverse multiplexor 65a for separating the identical phase component U and a vertical component V from the digital chrominance signal DU/V outputted from the first buffering unit 73, a first sample memory 65b for one-sample-delaying the digital luminance signal DY outputted from the first buffering unit 63 on the horizontal axis in accordance with a luminance clock $Y_{CLK}$, second sample memory 65c and third sample memory 65d for one-sample-delaying the identical phase component U and the vertical component V outputted from the reverse multiplexor 65a on the horizontal axis in accordance with the chrominance clock U/V$_{CLK}$, a first horizontal interpolation/decimation unit 65e for horizontally interpolating the digital luminance signal DY1 delayed by the first sample memory 65b and the previous digital luminance signal DY and for decimating the signal in accordance with the luminance clock $Y_{CLK}$, second and third horizontal interpolation/decimation units 65f and 65g for horizontally interpolating the identical phase component U1 delayed by the second sample memory 65c, the vertical component V1 delayed by the third sample memory 65d, and the previous vertical component V and for decimating the signal in accordance with the chrominance clock U/V$_{CLK}$, a multiplexor 65h for receiving the identical phase component U and the vertical component V from the second and third horizontal interpolation/decimation units 65f and 65g and for outputting a multiplexed digital chrominance signal DU/V1, a first line memory 65i for one-line-delaying the digital luminance signal DY2 outputted from the first horizontal interpolation/decimation unit 65e, a second line memory 65j for one-line-delaying the digital chrominance signal DU/V1 outputted from the multiplexor 65h, and first and second vertical interpolation unit 65k and 65l for vertically interpolating the digital luminance signal DY3 delayed by the first line memory 65i, the previous digital luminance signal DY2, the digital chrominance signal DU/V2 delayed by the second line memory 65j, and the previous digital chrominance signal DU/V1 and for outputting the digital luminance signal ARCDY1 and the digital chrominance signal ARCU/V1 of which its aspect ratio is adjusted.

In addition, the construction of the right-side picture processing unit 66 is the same as the left-side picture processing unit 65.

The operation of the double picture generation apparatus for a VCR according to the present invention will now be explained with reference to the accompanying drawings.

To begin with, the high frequency signal inputted to the system through the antenna ANT is distributed into two outputs by the antenna distribution unit 1 and inputted to the automatic antenna switching unit 7 and the broadcast signal receiving processing unit 10.

Among the signals, the high frequency signal inputted to the automatic antenna switching unit 7 is outputted to the television set (not shown) through the high frequency signal output terminal 110, and the high frequency signal inputted to the broadcast signal receiving processing unit 10 is converted into an intermediate frequency signal of a corresponding broadcast channel by the first and second tuner/ intermediate frequency processing units 10a and 10b, amplified, separated into a video signal and an audio signal, and inputted to the recording/reproducing unit 20. At this time, the broadcast signal receiving processing unit 10 may comprise only a first tuner/intermediate frequency processing unit 10a in accordance with the specification of the VCR.

At this time, when the user selects the recording mode, the first recording unit 20a and the second recording unit 20c selects a pair of video/audio signals, either two pairs of video/audio signals outputted from the first and second tuner/intermediate frequency processing units 10a and 10b or a pair of video/audio signals outputted from an externally connected audio/video input terminal 108, and records on a VHS video tape or an 8 mm video tape.

That is, when the VCR is in the recording mode, the high frequency signal of the broadcast station, which is distributed by the antenna distribution unit 1, is automatically selected by the automatic antenna switching unit 7 and is directly transmitted to the television set (not shown) side, a corresponding broadcast signal is displayed on the screen of the television set.

Thereafter, when the user selects the reproducing mode of the VCR, the first and second reproducing units 20b and 20d of the recording/reproducing unit 20 reproduce audio and video signals recorded on a VHS video tape or an 8 mm video tape, and the video signal is outputted to the video signal selection unit 50a, e.g. two 4×1 analog multiplexors, and the audio signal is outputted to the audio signal selection unit 50b, e.g., two 4×1 analog multiplexors.

The video signal selection unit 50a receives two video signals outputted from the first and second tuner/ intermediate frequency processing units 10a and 10b, two video signals reproduced by the first and second reproducing units 20b and 20d, and one video signal transmitted thereto from an externally connected audio/video input terminal 108, selects two video signals among five input video signals in accordance with a selection signal inputted to the selection signal input terminal 112, and outputs to the ARC/DW module 60.

In addition, the audio signal selection unit 50b receives two audio signals outputted from the first and second tuner/intermediate frequency processing units 10a and 10b, two audio signals reproduced by the first and second reproducing units 20b and 20d, and one audio signal inputted thereto through an externally connected audio/video input terminal 108, selects two audio signals among five input audio signals in accordance with a selection signal, and outputs to a phone jack terminal 111 of the VCR and the audio/video output terminal 109.

At this time, in case that the broadcast signal receiving processing unit 10 includes only one first tuner/intermediate frequency processing unit 10a, the video signal selection unit 50a and the audio signal selection unit 50b selectively output two video signals and two audio signals among four input video signals and four input audio signals.

In addition, the S-VHS selection unit 30 selects a video signal of the super-VHS (hereinafter called the "S-VHS") type among the video signals reproduced by the recording/ reproducing unit 20. When a video signal of the S-VHS type is selected, the S-VHS selection unit 30 outputs a control signal CS to the video signal selection unit 50a, and controls the video signal selection unit 50a to output one video signal among five or four input video signals, and outputs a video signal of the S-VHS to the ARC/DW module 60 through the A/D converter 40.

Therefore, the ARC/DW module 60 receives two video signals outputted from the video signal selection unit 50a, performs a horizontal interpolation, a decimation, and a vertical interpolation and outputs a video signal of a double picture of which its aspect ratio is adjusted, and the NTSC encoder 70 encodes a video signal of a double picture in accordance with the NTSC broadcast method and outputs to the audio/video output terminal 109.

Figure 5B:
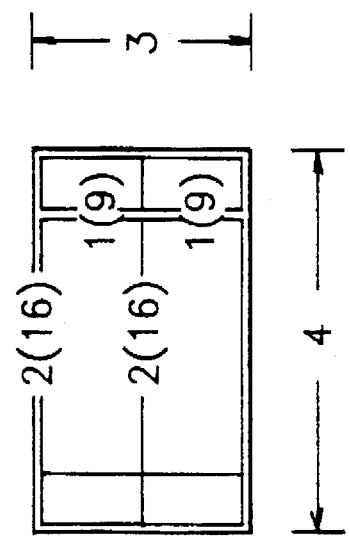
FIGS. 5A and 5B are illustrative views of a horizontal double picture and a vertical double picture according to the present invention.
Figure 5A:
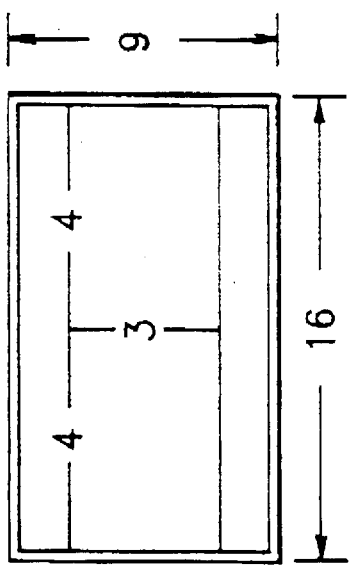

The high frequency modulation unit 6 receives a video signal of double pictures encoded by the NTSC encoder 70 and one audio signal outputted from the audio signal selection unit 50b, modulates into a high frequency signal, transmits to the television set side through the high frequency signal output terminal 110 of the automatic antenna switching unit 7, so that the double pictures, as shown in FIGS. 5A and 5B, are displayed on the screen of the television set. In addition, an audio with respect to the double picture is transmitted to speakers of the television set and the phone jack 111 of the VCR.

The operation of the ARC/DW module 60 will now be explained in more detail with reference to FIGS. 3 through 5A and 5B.

To begin with, as shown in FIG. 3, when two video signals are outputted from the output terminals 113 and 114 of the video signal selection unit 50a, the first and second NTSC decoders 62 and 63 decode the two video signals in accordance with the NTSC broadcast method and separate the signals into a luminance signal Y and a chrominance U/V.

Here, when the video signal of an S-VHS outputted from the A/D converter 40 is inputted to either the first NTSC decoder 62 or the second NTSC decoder 63 upon a switching of the switch 61, the NTSC decoder to which the video signal of the S-VHS is inputted decodes the video signal of the S-VHS, and the NTSC decoder of the another side decodes a video signal outputted from the video signal selection unit 50a and separates the signal into a luminance signal Y and a chrominance signal U/V.

The luminance signal Y and the chrominance signal U/V outputted from the first NTSC decoder 62 are obtained by adjusting the write/read speed difference between the luminance signal Y and the chrominance signal U/V using the first and second field memories 63a and 63b of the first buffering unit 63. At this time, when the ratio between the luminance signal Y and the chrominance signal U/V outputted from the first NTSC decoder 62 is 4:2:2, the first and second field memories 63a and 63b hold one field in a first-in-first-out (FIFO) manner, respectively, and when the ratio therebetween is 4:1:1, the first field memory 63a holds one field memory, and the second field memory 63b holds one-half of a field in a first-in-first-out (FIFO) manner, so that the write/read speed difference between the luminance signal Y and the chrominance signal U/V can be adjusted, and the thusly adjusted signals are outputted to the left-side processing unit 65.

In addition, the write/read speed difference between the luminance signal Y and the chrominance signal U/V outputted from the second NTSC decoder 63 is adjusted by the third and fourth field memories 64a and 64b and is outputted to the right-side picture processing unit 66.

Thereafter, the left-side picture processing unit 65 and the right-side picture processing unit 66 process the digital luminance signal DY and the digital chrominance signal DU/V buffered by the first buffering unit 63 and the second buffering unit 64. Here, since the operation between the left-side picture processing unit 65 and the right-side picture processing unit 66 are the same, only the left-side picture processing unit 65 will now be explained.

That is, as shown in FIG. 4, the first sample memory 65b of the left-side picture processing unit 65 one-sample-delays the digital luminance signal DY outputted from the first field memory 63a of the first buffering unit 63 on the horizontal axis in accordance with a luminance clock $Y_{CLK}$, and the reverse multiplexor 65a separates the digital chrominance signal DU/V outputted from the second field memory 63b of the first buffering unit 63 into the identical phase component U and a vertical component V, and the thusly separated identical phase component U and vertical component V are one-sample-delayed on the horizontal axis by the second sample memory 65c and the third sample memory 65d in accordance with a chrominance clock $U/V_{CLK}$.

At this time, when the ratio (Y:U:V) between the digital luminance signal DY and the digital chrominance signal DU/V outputted from the first field memory 63a and the second field memory 63b is 4:2:2, the chrominance clock $U/V_{CLK}$ is half of a cycle of the luminance clock, and when the ratio (Y:U:V) between the digital signal DY and the digital chrominance signal DU/V is 4:1:1, the chrominance clock $UV_{CLK}$ is one fourth (¼) cycle of the luminance clock, and the processing speed is adjusted. In addition, the phase of the chrominance clock $U/V_{CLK}$ outputted from the second sample memory 65c is opposed to the chrominance clock $U/V_{CLK}$ outputted from the third sample memory 65d.

The first horizontal interpolation/decimation unit 65e receives the digital luminance signal DY1, which is one-sample-delayed by the first sample memory 65b, and the previous digital luminance signal DY, creates a new digital luminance signal through a predetermined operation process, decimates in accordance with a luminance clock $Y_{CLK}$, controls the horizontal size thereof. In addition, the second horizontal interpolation/decimation unit 65f receives the identical phase component U1, which is one-sample-delayed, the previous identical phase component U, the one-sample-delayed vertical component V1, and the previous vertical component V, creates a new identical phase component and a vertical component through a predetermined operation process, decimates in accordance with the chrominance clock $U/V_{CLK}$ having an opposing phase, and controls the horizontal size thereof.

In addition, the digital luminance signal DY2, of which its horizontal size is adjusted by the first horizontal interpolation/decimation unit 65e, is delayed by one line by the first line memory 65i and inputted to the first vertical interpolation unit 65k. The identical phase component U2 and the vertical component V2 of which its horizontal size is respectively adjusted by the second horizontal interpolation/decimation unit 65f and the third horizontal interpolation/decimation unit 65g are converted into the multiplexed digital chrominance signal DU/V1 by the multiplexor 65h, and are one-line-delayed by the second line memory 65j, and inputted to the second vertical interpolation unit 65l.

The first vertical interpolation unit 65k receives the digital luminance signal DY3 which is one-line-delayed by the first line memory 65i and the previous digital luminance signal DY2, adjust the vertical size thereof by creating a new line through the operation with respect to the upper/lower line, outputs the digital luminance signal ARCDY1 of which the aspect ratio of the picture is adjusted to the luminance selection unit 67. In addition, the second vertical interpolation unit 65l receives the digital chrominance signal DU/V2 which is one-line-delayed by the second line memory 65j and the previous digital chrominance signal DU/V1 and adjusts the vertical size thereof by creating a new line through the operation with respect to the upper/lower line, so that the digital chrominance signal ARCDU/V1 of which its aspect ratio is adjusted is outputted to the chrominance selection unit 68.

In addition, the right-side picture processing unit 66, which is operated in the same way as the left-side picture processing unit 65, outputs a digital luminance signal ARCDY2 and a digital chrominance signal ARCDU/V2 of which its aspect ratio is respectively adjusted.

Therefore, the luminance selection unit 67 and the chrominance selection unit 68, as shown in FIG. 3, receive the digital luminance signals ARCDY1 and ARCDY2 which are processed by the left-side picture processing unit 65 and the right-side picture processing unit 66 in accordance with an output selection signal OSS inputted thereto through the selection signal input terminal 116, alternately selects the signals for one cycle of the output selection signal OSS, and outputs a double picture luminance signal Y and a double picture chrominance signal U/V, so that a horizontal double picture with an aspect ratio of 4:3, that is, a double picture of a double window format, is displayed on the screen with an aspect ratio of 16:9, as shown in FIG. 5A.

In addition, when alternately selecting by half of a field the digital luminance signals ARCY1 and ARCDY2 and the digital chrominance signals ARCDU/V1 and ARCDU/V1, which are processed by the left-side picture processing unit 65 and the right-side picture processing unit 66, it is possible to obtain a picture with a double window format as shown in FIG. 5B. That is, this method is directed to concurrently watching a 16:9 aspect ratio picture and a 2:1 aspect ratio picture on the screen with an aspect ratio of 4:3.

When a user wishes to watch only a single picture, the use selects a digital luminance signal and a digital chrominance signal either the left-side picture processing unit 65 or the right-side picture processing unit 66 in accordance with the output selection signal OSS.

The NTSC encoder 70 receives a digital luminance signal Y and a chrominance signal U/V which are alternately selected at every line or at half of a field by the luminance selection unit 67 and the chrominance selection unit 68, encodes the signals to a combined picture signal of a double picture in accordance with the NTSC broadcast method, outputs to the audio/video output terminal 109 and the high frequency modulation unit 6. The high frequency modulation unit 6 receives a combined video signal of a double picture, which is encoded by the NTSC encoder 70, and one audio signal outputted from the audio signal selection unit 50b, modulates the signals to a high frequency signal, and outputs the signals to the automatic antenna switching unit 7.

Therefore, the automatic antenna switching unit 7 directly transmits the high frequency signal outputted from the antenna distribution unit 1 to the television set in the recording mode, is automatically switched to the output side of the high frequency modulation unit 6, and outputs the high frequency signal of a double picture outputted from the high frequency modulation unit 6 to the high frequency signal output terminal 110, and thus a double picture, as shown in FIGS. 5A and 5B, is displayed on the screen of the television. An audio signal corresponding to the double picture is transmitted to the speakers of the television set and the phone jack 111 of the VCR.

As described above, the double picture generation apparatus for a video cassette tape recorder has advantages in that it is possible to concurrently watch double pictures with one television set by selecting two different video signals among a plurality of the video signals inputted thereto and by processing the selected video signals into a horizontal double picture and a vertical double picture in an ARC/DW module. In addition, it is possible to select a single picture format or a double pictures format in accordance with the user's desire by formatting two broadcasts into a double picture concurrently using the television channel and the VCR channel when adapting this embodiment to a TVCR (referred to a television set internally provided with a VCR).

In addition, it is possible to concurrently watch two different pictures by internally mounting this embodiment in a direct broadcasting satellite receiver having an LCD projector or two tuners, and it is possible to fabricate a set-top box type system having two paris of audio/video input terminals, a high frequency input terminal, a pair of audio/video output terminals, and a high frequency output terminal using an ARC/DW module.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A double picture generation apparatus for a video cassette tape recorder, comprising:
    a selection unit for receiving a video signal and an audio signal separated by a tuner/intermediate frequency processing unit, a video signal and an audio signal reproduced by a recording/reproducing unit, and a video signal and an audio signal inputted thereto through an audio/video input terminal, and for outputting at least two video signals and audio signals in accordance with a selection signal;
    an ARC/DW module for receiving two video signals outputted from said selection unit and generating a video signal of a double picture;
    an NTSC encoder for encoding a video signal of a double picture outputted from said ARC/DW module in accordance with an NTSC broadcast method and for outputting encoded video signal to an audio/video output terminal; and
    an output unit for modulating the video signal of a double picture encoded by said NTSC encoder and an audio signal outputted from said output unit and for outputting the modulated signals to a television set;
    wherein said ARC/DW module includes:
        first and second NTSC decoders for receiving first and second video signals, at least one of said first and second video signals being outputted from the selection unit;
        first and second buffering units for adjusting a write/read speed difference between a luminance signal and a chrominance signal outputted from said first and second NTSC decoders;

a first picture processing unit and a second picture processing unit for horizontally interpolating, decimating and vertically interpolating a digital luminance/chrominance signal outputted from said first and second buffering units and for outputting first-side and second-side picture video signals, respectively;

a luminance selection unit for alternatively selecting digital luminance signals outputted from said first-side picture processing unit and said second-side picture processing unit in accordance with an output selection signal and for outputting a luminance signal of a double picture; and a chrominance selection unit for outputting a chrominance signal of a double picture by alternately selecting a digital chrominance signal outputted from the first picture processing unit and the second picture processing unit in accordance with an output selection signal.

2. The apparatus of claim 1, wherein said ARC/DW module includes:

a switch for selectively switching a digitally converted S-VHS signal to one of a first and second NTSC decoder;

wherein said first-side picture video signal is a left-side picture video signal and said second-side picture video signal is a right-side picture video signal.

3. The apparatus of claim 2, wherein each of said left-side picture processing unit and said right-side picture processing unit includes:

a reverse multiplexor for separating a digital chrominance signal outputted from the first buffering unit into an identical phase component and a vertical component;

a first sample memory for one-sample-delaying a digital luminance signal outputted from the first buffering unit on the horizontal axis in accordance with a luminance clock;

second and third sample memories for one-sample-delaying the identical phase component and vertical component outputted from said reverse multiplexor on the horizontal axis in accordance with a chrominance clock;

a first horizontal interpolation/decimation unit for horizontally interpolating, and for decimating in accordance with the luminance clock, a digital luminance signal and a one-sample-delayed digital luminance signal;

second and third horizontal interpolation/decimation units for horizontally interpolating, and decimating in accordance with the chrominance clock, the identical phase component and a one-sample-delayed identical phase component, and the vertical component a one-sample-delayed vertical component, respectively;

a multiplexor for receiving the identical phase component and the vertical component from the first horizontal interpolation/decimation unit and for outputting a multiplexed digital chrominance signal;

a first line memory for one-line-delaying a digital luminance signal outputted from the first horizontal interpolation/decimation unit;

a second line memory for one-line-delaying a digital chrominance signal outputted from the multiplexor; and first and second vertical interpolation units for vertically interpolating a digital luminance signal and a one-line-delayed digital luminance signal, and a digital chrominance signal and a one-line-delayed digital chrominance signal, and for outputting an-aspect-ratio-adjusted digital luminance signal and digital chrominance signal respectively.

4. The apparatus of claim 3, wherein said chrominance clock outputted from the second sample memory and the second horizontal interpolation/decimation unit has a certain phase which is opposed to that of the chrominance clock inputted to the third sample memory and the third horizontal interpolation/decimation unit.

5. The apparatus of claim 1, wherein said double picture generation apparatus further includes:

an S-VHS selection unit for selecting a video signal of the reproduced S-VHS when a video signal of the S-VHS is reproduced by the recording/reproducing unit and for outputting a control signal to the selection unit; and an A/D converter for digitally converting a video signal of an S-VHS type selected by the S-VHS selection unit and for outputting the signals to said ARC/DW module.

6. The apparatus of claim 1, wherein said selection unit includes a video selection unit and an audio selection unit, and each of which includes two 4×1 analog multiplexors.

7. The apparatus of claim 1, wherein said selection unit is operable to receive video and audio signals from at least two tuner/intermediate processing units.

8. The apparatus of claim 1, wherein said recording/reproducing unit has a double deck structure which is provided with a first recording unit and a first reproducing unit for recording/reproducing a VHS tape signal in accordance with a specification of the VCR; and a second recording unit and a second reproducing unit for recording/reproducing an 8 mm tape signal.

9. The apparatus of claim 2, wherein said chrominance signal clock is half of a cycle of a luminance clock when a ratio between the digital luminance signal and the digital chrominance signal is 4:2:2, and said chrominance signal clock is a quarter of a cycle of a luminance clock when a ratio between a digital luminance signal and a digital chrominance signal is 4:1:1.

10. The apparatus of claim 1, wherein said selection unit is directed to selecting and outputting one video signal in accordance with a control signal of the S-VHS selection unit when a video signal of the S-VHS is reproduced.

11. The apparatus of claim 1, wherein said selection unit outputs two audio signals which are outputted to the television set through a phone jack of a VCR and an audio/video output terminal.

12. The apparatus of claim 2, wherein said luminance selection unit and chrominance selection unit alternately select a digital luminance signal and a digital chrominance signal, output the luminance signal and the chrominance signal of a double picture, select the digital luminance signal and digital chrominance signal by half of a field and outputs a luminance signal and a chrominance signal, which has a double structure, in accordance with an output selection signal.

13. The apparatus of claim 2, wherein said first buffering unit includes first and second first-in-first-out memories, and said second buffering includes third and fourth first-in-first-out memories.

14. The apparatus of claim 13, wherein said first, second, third and fourth first-in-first-out memories hold one field when a ratio (Y:U:V) between a digital luminance signal and digital chrominance signal is 4:2:2, and said first and third first-in-first-out memories hold one field, and said second and fourth first-in-first-out memories hold one-half of a field (½) when a ratio (Y:U:V) between a digital luminance signal and a digital chrominance signal is 4:1:1.

* * * * *